United States Patent
Toya et al.

(10) Patent No.: US 10,044,437 B2
(45) Date of Patent: Aug. 7, 2018

(54) RADIO COMMUNICATION SYSTEM, INFORMATION PROVIDING DEVICE, MOBILE TERMINAL, AND METHOD FOR PROVIDING INFORMATION TO MOBILE TERMINAL

(75) Inventors: Masahiro Toya, Osaka (JP); Masafumi Kobayashi, Osaka (JP); Hideaki Shiranaga, Osaka (JP); Hirofumi Urayama, Osaka (JP); Shohei Ogawa, Osaka (JP); Shotaro Abe, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/356,297

(22) PCT Filed: Sep. 5, 2012

(86) PCT No.: PCT/JP2012/072611
§ 371 (c)(1),
(2), (4) Date: May 5, 2014

(87) PCT Pub. No.: WO2013/069364
PCT Pub. Date: May 16, 2013

(65) Prior Publication Data
US 2014/0308897 A1 Oct. 16, 2014

(30) Foreign Application Priority Data
Nov. 8, 2011 (JP) .................................. 2011-244140

(51) Int. Cl.
*H04N 21/6405* (2011.01)
*H04N 21/6408* (2011.01)
(Continued)

(52) U.S. Cl.
CPC ......... *H04B 7/26* (2013.01); *H04N 21/41407* (2013.01); *H04N 21/41422* (2013.01);
(Continued)

(58) Field of Classification Search
CPC combination set(s) only.
See application file for complete search history.

(56) References Cited

U.S. PATENT DOCUMENTS 5,999,623 A * 12/1999 Bowman ................ H04H 60/15
348/E7.056
7,426,437 B2 * 9/2008 Breed .................. B60N 2/2863
340/435
(Continued)

FOREIGN PATENT DOCUMENTS

JP 2806801 B2 9/1998
JP 2002-367091 A 12/2002
(Continued)

OTHER PUBLICATIONS

"Further Enhancements of LTE—LTE Release 9 -," NTT DOCOMO Technical Journal vol. 18, No. 1, pp. 48-55, including English language translation.

*Primary Examiner* — Cindy Trandai
(74) *Attorney, Agent, or Firm* — Drinker Biddle & Reath LLP (57) ABSTRACT

Downlink is achieved by point-to-multipoint communication. There is provided a radio communication system 1 that provides information to a mobile terminal 3 via a radio communication device 2 that performs radio communication with the mobile terminal 3. The mobile terminal 3 is capable of receiving first downlink information that has been transmitted by point-to-multipoint radio communication receivable by a plurality of the mobile terminals 3, and capable of receiving second downlink information that has been transmitted by point-to-point communication. The mobile termi-
(Continued)

nal 3 is capable of transmitting uplink information by point-to-point radio communication. The first downlink information and the second downlink information are formed such that information to be used in the mobile terminal 3 is obtained when the mobile terminal 3 performs information processing by using both the first downlink information and the second downlink information.

16 Claims, 7 Drawing Sheets (51) Int. Cl.
    *H04B 7/26* (2006.01)
    *H04W 4/06* (2009.01)
    *H04W 12/02* (2009.01)
    *H04N 21/414* (2011.01)
    *H04N 21/61* (2011.01)
    *G08G 1/16* (2006.01)
    *H04L 29/06* (2006.01)
    *H04W 4/04* (2009.01)
    *H04W 12/04* (2009.01)

(52) U.S. Cl.
    CPC ..... *H04N 21/6131* (2013.01); *H04N 21/6181* (2013.01); *H04N 21/6405* (2013.01); *H04N 21/6408* (2013.01); *H04W 4/06* (2013.01); *H04W 12/02* (2013.01); *G08G 1/166* (2013.01); *H04L 63/0428* (2013.01); *H04L 63/062* (2013.01); *H04L 63/068* (2013.01); *H04L 63/18* (2013.01); *H04W 4/046* (2013.01); *H04W 12/04* (2013.01)

(56) References Cited

U.S. PATENT DOCUMENTS

| | | | | |
|---|---|---|---|---|
| 7,680,588 B2* | 3/2010 | Tsukamoto | .......... | G08G 1/0104 701/117 |
| 7,873,836 B2* | 1/2011 | Rekimoto | .......... | H04L 63/0428 380/270 |
| 8,364,986 B2* | 1/2013 | Stahlin | .......... | B60W 40/12 713/168 |
| 2002/0023010 A1* | 2/2002 | Rittmaster | .......... | G06F 17/3087 705/26.1 |
| 2003/0063591 A1* | 4/2003 | Leung | .......... | H04L 12/1886 370/338 |
| 2004/0202329 A1* | 10/2004 | Jung | .......... | H04L 63/0428 380/273 |
| 2004/0228490 A1* | 11/2004 | Klemba | .......... | H04L 63/0428 380/270 |
| 2005/0013326 A1* | 1/2005 | Vinagre | .......... | H04L 12/189 370/522 |
| 2005/0195814 A1* | 9/2005 | Hagiwara | .......... | H04L 45/00 370/389 |
| 2006/0115085 A1* | 6/2006 | Iwamura | .......... | H04L 9/0822 380/259 |
| 2006/0287918 A1* | 12/2006 | Canaday | .......... | G06Q 20/14 705/14.69 |
| 2007/0089149 A1* | 4/2007 | You | .......... | H04H 20/28 725/105 |
| 2008/0298280 A1* | 12/2008 | Joshi | .......... | H04W 64/00 370/280 |
| 2009/0171547 A1* | 7/2009 | Hyde | .......... | F02D 41/021 701/102 |
| 2009/0248283 A1* | 10/2009 | Bicego, Jr. | .......... | G01C 21/3691 701/117 |
| 2010/0130234 A1* | 5/2010 | Shin | .......... | H04L 12/1859 455/456.3 |
| 2010/0232605 A1* | 9/2010 | Kim | .......... | G08G 1/092 380/255 |
| 2011/0213968 A1* | 9/2011 | Zhang | .......... | H04L 63/20 713/158 |
| 2012/0026014 A1* | 2/2012 | Miller | .......... | G08G 1/07 340/929 |
| 2012/0282895 A1* | 11/2012 | Bai | .......... | H04H 20/08 455/410 |
| 2013/0194108 A1* | 8/2013 | Lapiotis | .......... | G08G 1/096716 340/905 |
| 2013/0230173 A1* | 9/2013 | Hori | .......... | G08G 1/092 380/281 |
| 2013/0254469 A1* | 9/2013 | Miyake | .......... | G06F 8/665 711/103 |
| 2014/0032088 A1* | 1/2014 | Chang | .......... | G08G 1/0112 701/117 |
| 2016/0216125 A1* | 7/2016 | Ahn | .......... | G06Q 50/30 |

FOREIGN PATENT DOCUMENTS

JP           2005-159696 A     6/2005
WO    WO 2006/054860 A1   5/2006

\* cited by examiner

RADIO COMMUNICATION SYSTEM, INFORMATION PROVIDING DEVICE, MOBILE TERMINAL, AND METHOD FOR PROVIDING INFORMATION TO MOBILE TERMINAL

TECHNICAL FIELD

The present invention relates to a radio communication system and the like.

BACKGROUND ART

In recent years, intelligent transport systems (ITS) have been studied in which information received from infrastructure devices installed on roads is utilized to improve safety of vehicles (refer to Patent Literature 1, for example).

CITATION LIST

Patent Literature

PATENT LITERATURE 1: Japanese Patent No. 2806801

SUMMARY OF INVENTION

Technical Problem

In an ITS, in order to provide a vehicle with information such as traffic information, a downlink for transmitting the information from a road side unit (RSU) to the vehicle is needed.

Further, for more appropriate information provision, it is desirable to realize an uplink for transmitting information (probe data; floating car data) such as travel data of the vehicle, from the vehicle to the road side unit. When receiving the information from the vehicle via the uplink, a computer that manages the ITS updates the traffic information to perform more appropriate information provision to the vehicle.

The inventors of the present invention have come up with an idea that a mobile communication system established for mobile phones can be utilized as a communication system for the ITS. However, in the mobile communication system for mobile phones, point-to-point communication is basically performed. Therefore, it is necessary to establish point-to-point communication connection between a road side unit and a vehicle before downlink and uplink communications.

Specifically, first, a mobile terminal installed in a vehicle requests a road side unit to establish communication connection. The road side unit allocates, to the mobile terminal having performed the request, a radio resource (such as radio communication band) that is available only between the road side unit and the mobile terminal, thereby establishing communication connection. When the communication connection is established, the road side unit and the mobile terminal are allowed to perform point-to-point downlink and uplink communications.

However, if the mobile phone communication system is simply used for the ITS, when the number of mobile terminals installed in vehicles increases due to an increase in traffic, more wireless resources are required by that much. Therefore, in a place where traffic is heavy, it is necessary to prepare many radio resources in advance.

Furthermore, since the amount of data transmitted via the downlink is larger than the amount of data transmitted via the uplink, it is necessary to allocate, for each vehicle, many radio resources for transmitting downlink data, which might cause depletion of radio resources.

The present invention has been made in view of the above-mentioned problems.

Solution to Problem (1) According to an aspect of the present invention, there is provided a radio communication system that provides information to a mobile terminal via a radio communication device that performs radio communication with the mobile terminal. The mobile terminal is capable of receiving first downlink information that has been transmitted by point-to-multipoint radio communication receivable by a plurality of the mobile terminals, and capable of receiving second downlink information that has been transmitted by point-to-point communication. In addition, the mobile terminal is capable of transmitting uplink information by point-to-point radio communication. The first downlink information and the second downlink information are formed such that information to be used in the mobile terminal is obtained when the mobile terminal performs information processing by using both the first downlink information and the second downlink information.

According to the present invention, since the first downlink information is transmitted by the point-to-multipoint radio communication, it is possible to suppress an increase in radio resources even if the number of mobile terminals increases. In addition, since the mobile terminal needs to receive the second downlink received by the point-to-point radio communication, it can be expected that transmission of the uplink information is performed by the point-to-point radio communication.

(2) Preferably, the first downlink information includes encrypted information, and the second downlink information includes decryption information for decrypting the encrypted first downlink information. In this case, the encrypted information can be decrypted by using the decryption information.

(3) Preferably, the second downlink information includes information that is relevant to only a part of the first downlink information.

(4) Preferably, the first downlink information includes traffic information, and the uplink information includes position information of the mobile terminal.

(5) Preferably, the first downlink information includes information to be updated based on the uplink information.

(6) Preferably, the decryption information is disposable decryption information.

(7) Preferably, the mobile terminal transmits uplink information by the point-to-point communication when the mobile terminal becomes ready to receive the first downlink information.

(8) Preferably, the second downlink information varies depending on the content of the uplink information.

(9) Preferably, the second downlink information includes option information that has been requested, in the uplink information, to be included in the second downlink information.

(10) According to another aspect of the present invention, there is provided an information providing device that provides information to a mobile terminal via a radio communication device that performs radio communication with the mobile terminal. The information providing device includes: a first information providing section that provides, to the radio communication device, first downlink information to be transmitted from the radio communication device by point-to-multipoint transmission receivable by a plurality of the mobile terminals; a second information providing section that provides, to the radio communication device, second downlink information to be transmitted from the radio communication device by point-to-point communication with the mobile terminal; and an acquisition section that acquires, via the radio communication device, uplink information transmitted from the mobile terminal to the radio communication device by the point-to-point communication. The first downlink information and the second downlink information are formed such that information to be used in the mobile terminal is obtained when the mobile terminal performs information processing by using both the first downlink information and the second downlink information.

(11) According to another aspect of the present invention, there is provided a mobile terminal that performs radio communication with a radio communication device. The mobile terminal includes: a reception section capable of receiving first downlink information that has been transmitted by point-to-multipoint radio communication receivable by other mobile terminals, and capable of receiving second downlink information that has been transmitted by point-to-point radio communication; a transmission section capable of transmitting uplink information by the point-to-point communication; and an information processing section that performs information processing using both the received first downlink information and second downlink information.

(12) According to another aspect of the present invention, there is provided a method for providing information to a mobile terminal. The method includes: a step of causing the mobile terminal to receive first downlink information that has been transmitted by point-to-multipoint radio communication receivable by a plurality of the mobile terminals; a step of the mobile terminal transmitting uplink information by point-to-point radio communication; a step of causing the mobile terminal to receive second downlink information transmitted by the point-to-point communication; and a step of the mobile terminal using information obtained by performing information processing by using both the first downlink information and the second downlink information that have been received.

Advantageous Effects of Invention

According to the present invention, it is possible to suppress an increase in radio resources even if the number of mobile terminals increases. In addition, since a mobile terminal needs to receive second downlink information transmitted by point-to-point radio communication, it can be expected that transmission of uplink information is performed by point-to-point radio communication.

DESCRIPTION OF EMBODIMENTS

[1. Overall Configuration of System]

Figure 1:
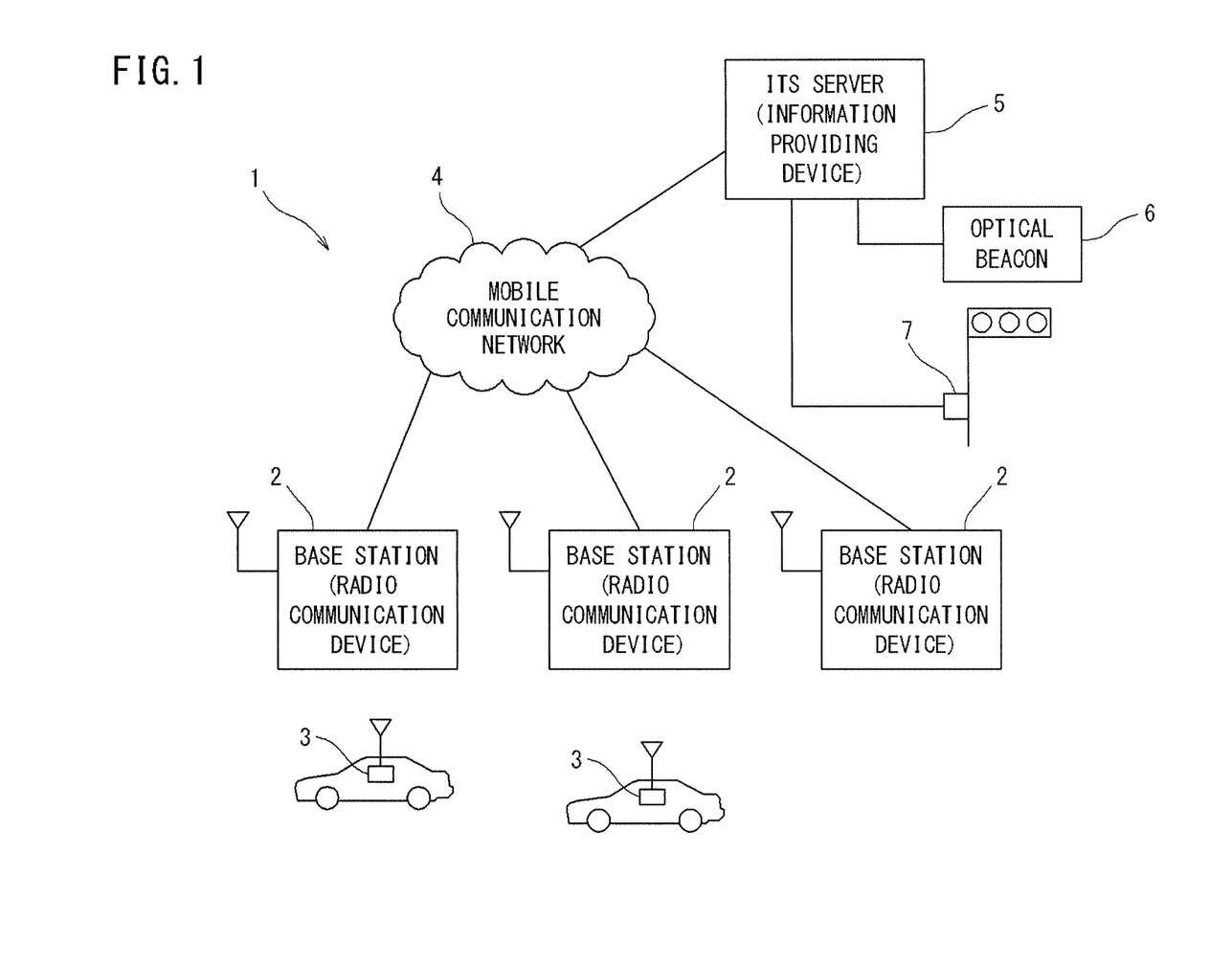
FIG. 1 is an overall configuration diagram of a radio communication system.

FIG. 1 shows an intelligent transport system utilizing a mobile communication system (radio communication system) 1.

The mobile communication system 1 includes a plurality of base stations (radio communication devices) 2. The base stations 2 perform radio communications with mobile terminals (including mobile phones) 3 such as on-vehicle devices installed in vehicles. In the present embodiment, the mobile communication system conforms to LTE (Long Term Evolution). However, the communication standard is not limited to the LTE.

The plurality of base stations 2 are connected to each other via a mobile communication network 4. The mobile communication network 4 includes a gateway (refer to FIG. 2) 41, and the base stations 2 are connected to an ITS server (information providing device) 5 via the gateway 41.

The ITS server 5 generates information valuable for the vehicles, such as traffic information. The ITS server 5 provides the generated information to the mobile terminals 3 via the base stations 2 in the mobile communication network 4. In the present embodiment, radio communications with the mobile terminals 3 installed in the vehicles can be performed by utilizing a mobile communication system (communication system for mobile phones) established for mobile terminals such as mobile phones, and therefore, it is not necessary to separately provide radio communication devices (road side units) dedicated for radio communications with the vehicles.

The ITS server 5 acquires information such as probe data from the vehicles, and updates the traffic information. Therefore, the more data the ITS server 5 acquires from the vehicles, the more appropriate traffic information the ITS server 5 can generate. The ITS server 5 is connected, via wired communication lines, to a road side sensor such as an optical beacon 6 and to a device such as a traffic signal controller 7. The ITS server 5 can update the traffic information based on information acquired from various sensors. Further, the ITS server 5 can control the traffic signal controller 7.

Figure 2:
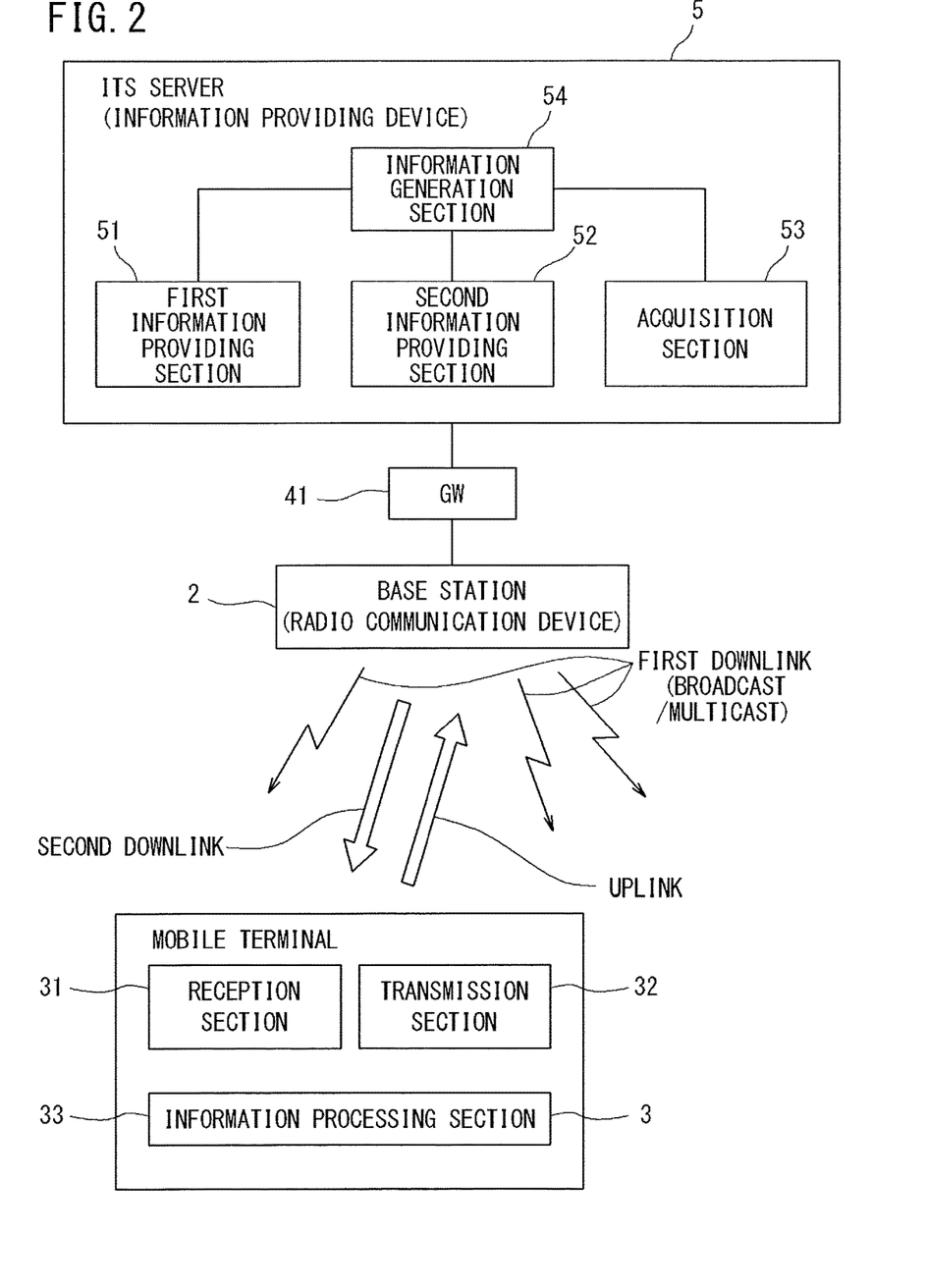
FIG. 2 is a configuration diagram showing an ITS server and a mobile ten final.

As shown in FIG. 2, the ITS server (information providing device) 5 includes a first information providing section 51, a second information providing section 52, an acquisition section 53, and an information generation section 54.

In each mobile terminal 3, an ITS application (computer program) for communication with the ITS server 5 is installed. The ITS application causes a computer included in the mobile terminal 3 to function as a reception section 31, a transmission section 32, and an information processing section 33.

The first information providing section 51 of the ITS server 5 provides, to the mobile communication network 4, first downlink information to be transmitted to a plurality of mobile terminals 3 by point-to-multipoint communication (broadcasting or multicasting) with the mobile terminals 3, among information (downlink information) transmitted from a base station 2.

In the LTE, the point-to-multipoint communication may utilize, for example, MBMS (Multimedia Broadcast Multicast Service). The MBMS uses, for data transmission, MCH as a transport channel, and MCCH and MTCH as logical channels.

When the mobile communication system 1 conforms to LTE, the first information providing section 51 functions as a BMSC (Broadcast Multicast Service Center) in the LTE.

The second information providing section 52 provides, to the mobile communication network 4, second downlink information to be transmitted to a mobile terminal 3 by point-to-point communication (unicasting) with the mobile terminal 3, among the information (downlink information) transmitted from the base station 2.

The acquisition section 53 acquires, via the mobile communication network 4, information (uplink information) transmitted from the mobile terminal 3 to the base station 2 by point-to-point communication.

The first downlink information may include traffic information such as: signal information of traffic signal controllers provided in or near areas covered by one or a plurality of base stations 2; on-road traffic condition information (link travel time, degree of traffic congestion and/or length of traffic congestion, average travel speed, and the like); event information about accident, disaster, or the like; and information about traffic restriction.

The first information providing section 51 encrypts part or entirety of the first downlink information to be transmitted. The partially or entirely encrypted first downlink information is provided to the gateway (BMSC-GW) 41. The gateway 41 distributes the first downlink information to each base station 2.

Upon receiving the first downlink information, the base station 2 transmits, by broadcasting or multicasting, the partially or entirely encrypted first downlink information to the mobile terminals 3 in its communication area (cell).

In a mobile terminal 3 executing the ITS application, the reception section 31 can receive the first downlink information transmitted from the base station 2. Even if the mobile terminal 3 has not established point-to-point communication connection with the base station 2, the mobile terminal 3 can receive the first downlink information transmitted by point-to-multipoint communication. Accordingly, when receiving the first downlink information, the mobile terminal 3 need not perform a point-to-point communication connection establishing process. Further, a data communication fee is prevented from arising.

A radio communication device performing point-to-multipoint communication may be a radio communication device (e.g., a radio communication device dedicated to ITS) different from a radio communication device performing point-to-point communication. In this case, the radio communication device performing point-to-point communication need not have a function of broadcasting or multicasting. Further, in this case, the radio communication device dedicated to ITS may be a communication device that conforms to, for example, WAVE (Wireless Access in Vehicular Environments) or DSRC (Dedicated Short Range Communications) based on IEEE802.11p.

Transmitting the first downlink information by broadcasting or multicasting makes it unnecessary to individually allocate a radio resource to each mobile terminal 3, thereby reducing the likelihood of depletion of radio resources even when the amount of the first downlink information is large.

When the mobile terminal 3 installed in the vehicle becomes ready to receive the first downlink information, the transmission section 32 of the mobile terminal 3 transmits uplink information (probe data) such as the current position of the vehicle, the current time, and the past travel locus, to the base station 2 by point-to-point communication. When the mobile terminal 3 is not ready to receive the first downlink information, it is desirable that the mobile terminal 3 does not transmit the uplink information. Thus, the mobile terminal 3 that cannot receive the first downlink information is prevented from wastefully transmitting the uplink information.

Establishment of point-to-point communication (unicasting) connection between the mobile terminal 3 and the base station 2 is triggered by an access start process from the mobile terminal 3 to a specific address. The specific address is, for example, an IP address (URL) set on the ITS server 5. Besides the IP address, the specific address may be an address assigned to a person who desires to access the ITS server 5 on the communication network.

Establishment of the point-to-point communication connection between the mobile terminal 3 and the base station 2 may be triggered by the mobile terminal 3 calling a telephone number prepared for ITS services in advance.

The uplink information transmitted from the mobile terminal 3 to the base station 2 is transmitted from the base station 2 to the ITS server 5 via the mobile communication network 4 and the Internet. The acquisition section 53 of the ITS server 5 provides, to the information generation section 54, the uplink information acquired from the base station 2. Based on the uplink information acquired by the acquisition section 53, the information generation section 54 can update the traffic information provided as the first downlink information.

The probe data included in the uplink information includes at least information about the current position of the mobile terminal 3, and may also include information about a plurality of positions in the past (information about the travel locus). Further, the probe data may include information indicating the state of a device or a sensor installed in the vehicle (e.g., the travel speed, whether a wiper is in use, the operating state of an ABS (Antilock Brake System) installed in the vehicle, the number of occupants in the vehicle, the distances between the vehicle, and a preceding vehicle and a following vehicle).

When the ITS server 5 acquires the uplink information from the mobile terminal 3, the second information providing section 52 provides, to the mobile communication network 4 side, a decryption key (second downlink information) as decryption information for decrypting the encrypted first downlink information.

The decryption key (second downlink information) is transmitted from the base station 2 that has established point-to-point communication connection with the mobile terminal 3 that has transmitted the uplink information, to the mobile terminal 3, via the point-to-point communication. The transmitted decryption key (second downlink information) is received by the reception section 31 of the mobile terminal 3.

As described above, when the mobile terminal 3 has transmitted the uplink information, the mobile terminal 3 can obtain the second downlink information in exchange for the uplink information. That is, the mobile terminal 3 that has transmitted the uplink information can obtain both the first downlink information and the second downlink information.

Figure 3:
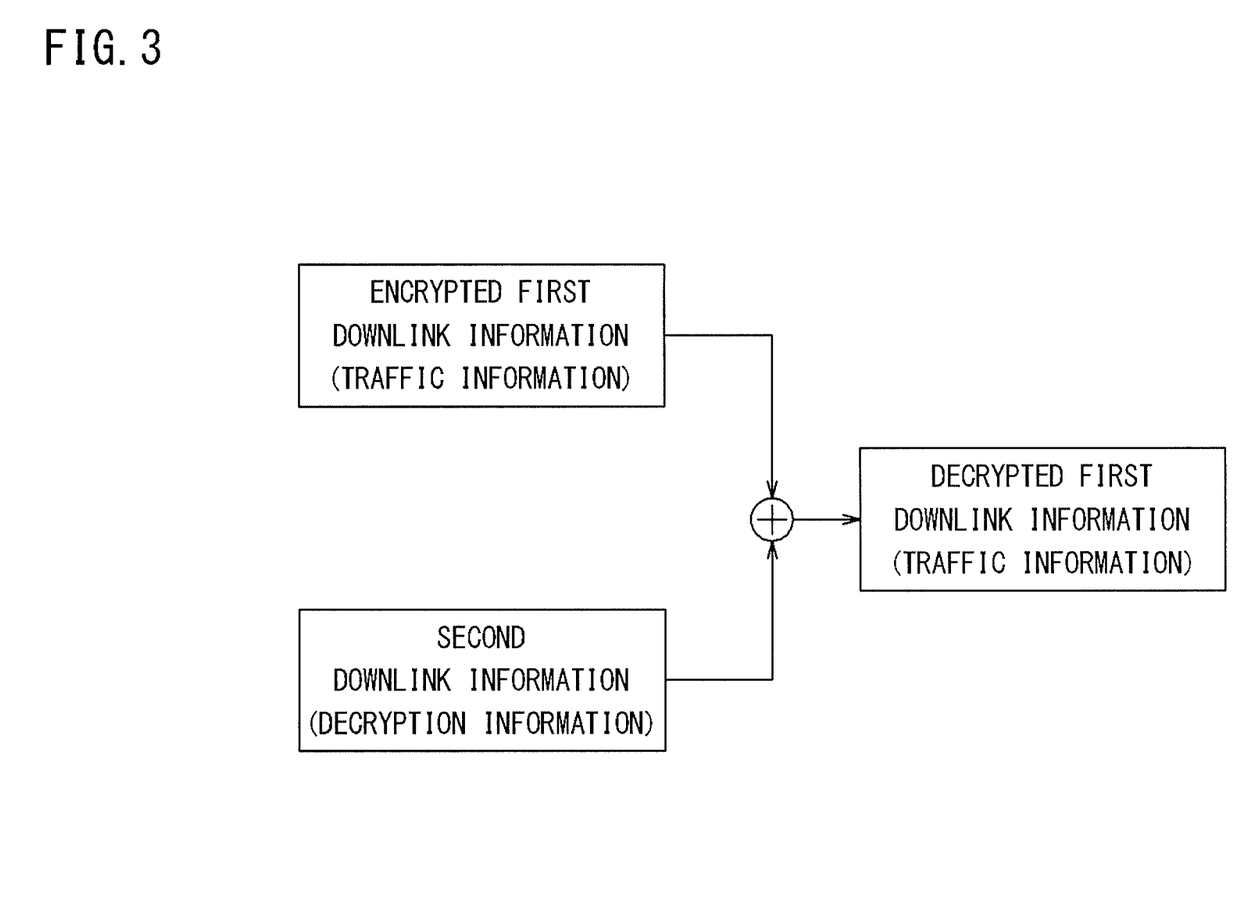
FIG. 3 is a diagram showing examples of first downlink information and second downlink information.

As shown in FIG. 3, the information processing section 33 of the mobile terminal 3 obtains necessary information by combining the received first downlink information and second downlink information. In the present embodiment, the second downlink information is the decryption key for decrypting the encrypted first downlink information.

Accordingly, the information processing section 33 performs a decryption process on the first downlink information by using the decryption key to obtain the decrypted first downlink information (traffic information; information to be used in the mobile terminal).

On the other hand, the mobile terminal 3 that has not transmitted the uplink information cannot obtain the decryption key (second downlink information), and therefore, cannot decrypt the first downlink information. Accordingly, the mobile terminal 3 that has not transmitted the uplink information cannot obtain a part or entirety of the necessary information (traffic information) even though the mobile terminal 3 has received the first downlink information.

If the mobile terminal 3 can obtain the necessary information by only receiving the first downlink information transmitted by point-to-multipoint communication, it is less beneficial for the mobile terminal 3 to transmit the uplink information after taking the trouble to establish point-to-point communication connection.

That is, it is essentially less beneficial for the individual on-vehicle mobile terminal 3 to transmit the uplink information such as probe data. In spite of this, if the mobile terminal 3 attempts to communicate with the base station 2 after establishing point-to-point communication connection with the base station 2, the mobile terminal 3 consumes the power, which is disadvantageous if the mobile terminal 3 is of a battery driven type. In addition, a data communication fee arises.

On the other hand, it is desirable for the ITS server 5 to collect as much uplink information such as probe data as possible. The reason is because the ITS server 5 becomes able to grasp the traffic condition more accurately by the probe data collected by the uplink from the on-vehicle mobile terminals 3. As a result, the traffic information provided from the ITS server 5 side to the mobile terminals 3 becomes more precise, and control for traffic infrastructure equipment such as the traffic signal controller 7 becomes more appropriate.

Thus, in the present embodiment, since the mobile terminal 3 that has transmitted the uplink information can obtain the decryption key, it is possible to urge the mobile terminal 3 that desires the downlink information to transmit the uplink information.

Moreover, even when the second downlink information is transmitted by point-to-point communication to the mobile terminal 3 that has transmitted the uplink information, since the amount of the second downlink information (decryption key) is smaller than the amount of the first downlink information, depletion of communication resources is less likely to occur.

The decryption key transmitted as the second downlink information is configured to be a disposable decryption key. By using the disposable decryption key, it is expected that retransmission of uplink information is performed when the decryption key becomes unusable.

For example, the disposable decryption key is valid within a validity period, and becomes unusable when the validity period has elapsed. For example, when the validity period has elapsed, the decryption key needed for decryption may be changed so that decryption cannot be performed with the old decryption key. Alternatively, the decryption key may be deleted from the mobile terminal 3 when the validity period has elapsed.

The validity period may be set to 3 seconds or 5 seconds, for example. It is desirable that the validity period is equal to or shorter than a time period that is desired by the base station 2 as an uplink information transmission period. If the base station 2 does not have ample communication resources, the validity period may be set longer.

Further, the decryption key may be made disposable by providing the number of times of decryption (the number of times of use) with an upper limit such as one time or a few times.

The decryption key may be valid for only decryption of the first downlink information from the base station 2 that has transmitted the decryption key, or may be valid for only decryption of the first downlink information from a plurality of specific base stations 2 (e.g., the base station that has transmitted the decryption key and its neighboring base stations). Further, the decryption key may be valid only when the mobile terminal 3 exists at a position in a predetermined area (e.g., the communication area of the base station that has transmitted the decryption key and its neighborhood).

Figure 4:
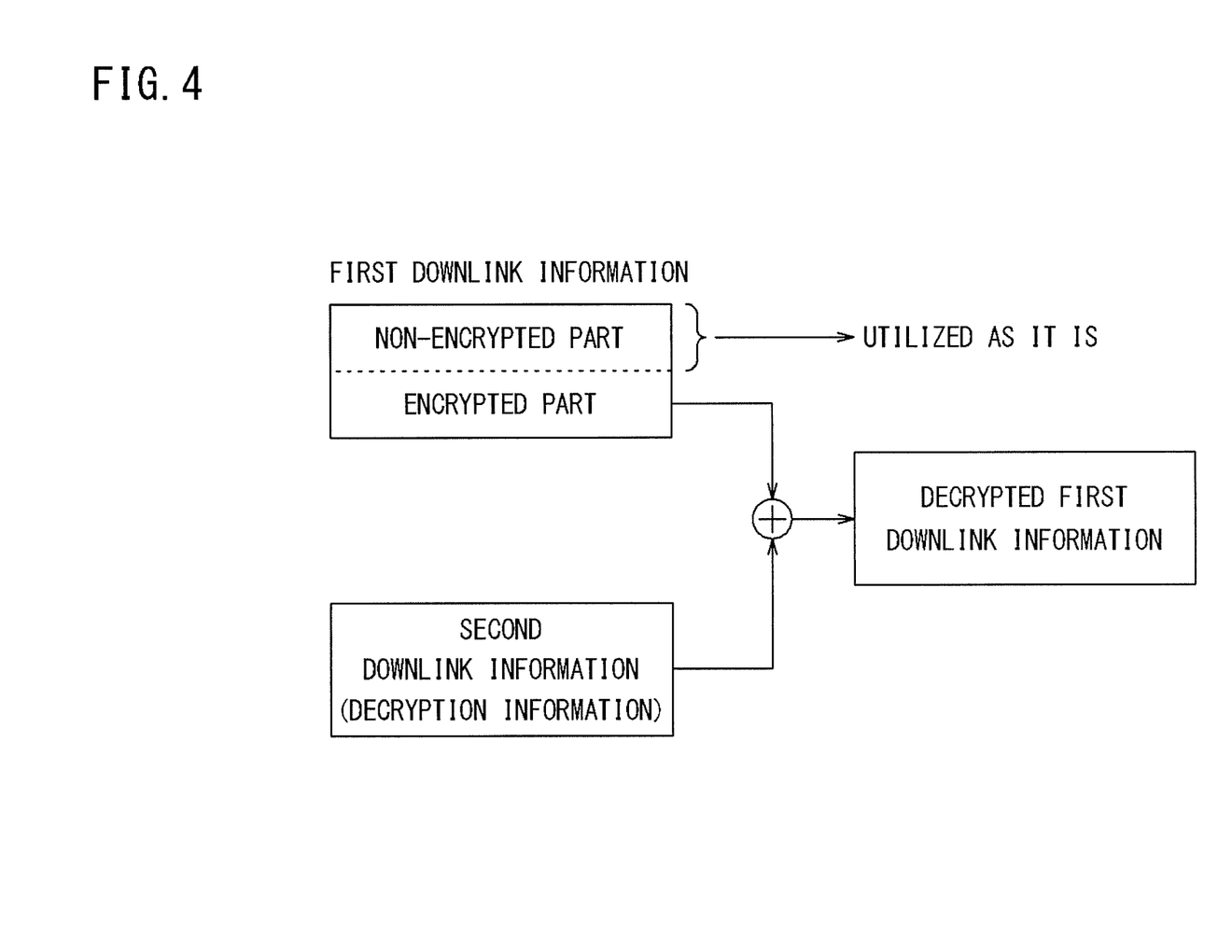
FIG. 4 is a diagram showing examples of first downlink information and second downlink information.

Further, the first downlink information need not be entirely encrypted. As shown in FIG. 4, the first downlink information may include a non-encrypted part and an encrypted part. In this case, the decryption key is used to decrypt the encrypted part. The non-encrypted part may include emergency notification (information notifying occurrence of accident, disaster, or the like) or information about an identification number of the base station or the current time. The non-encrypted part may be advertising information or the like.

The first downlink information and the second downlink information are not limited to encrypted information and a decryption key therefor.

For example, the first downlink information may be formed such that the first downlink information alone is useless or difficult to use, for the mobile terminal 3. The first downlink information may be formed such that the mobile terminal 3 can obtain information to use, when the mobile terminal 3 acquires the second downlink information in addition to the first downlink information.

Figure 5:
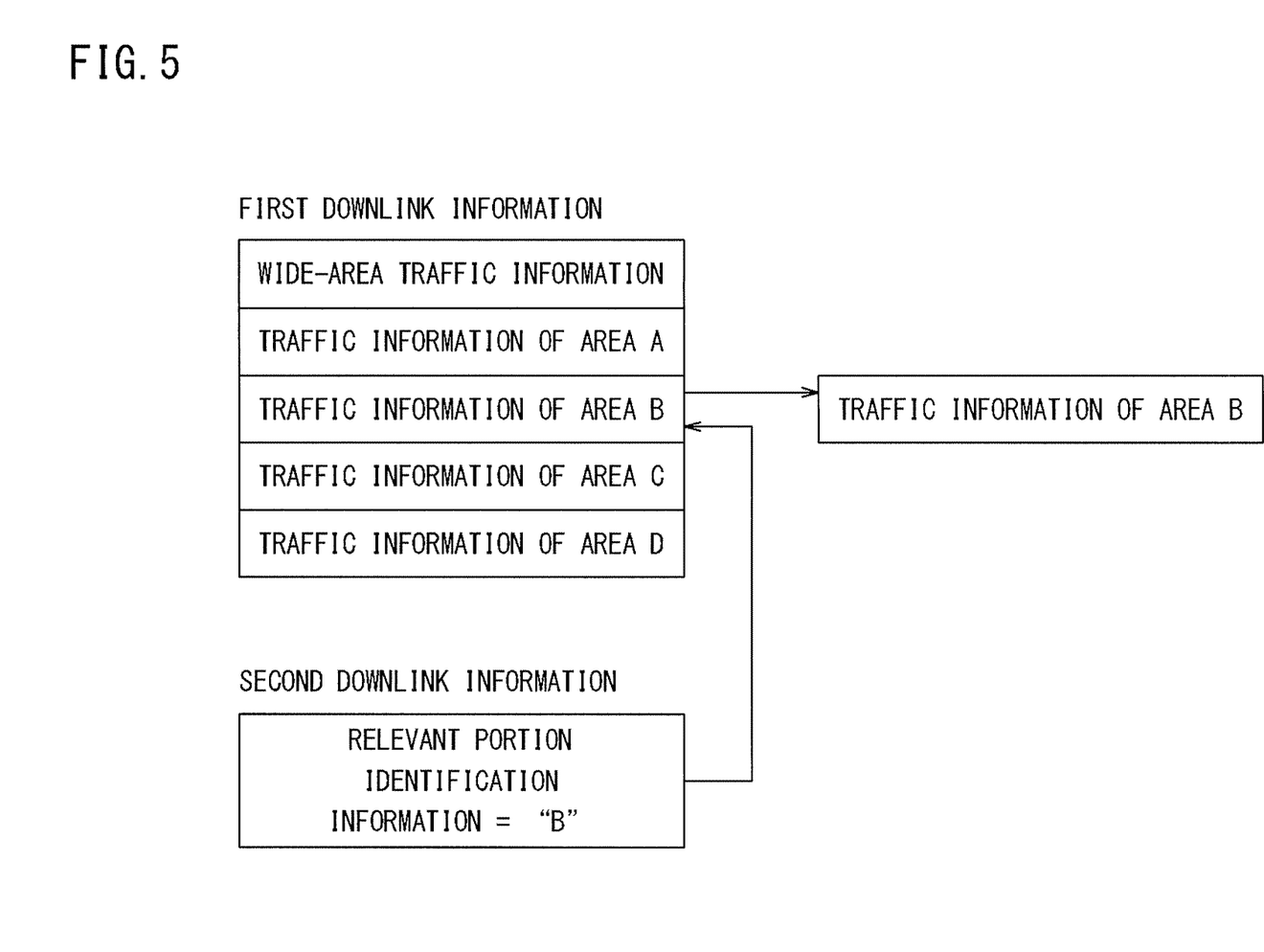
FIG. 5 is a diagram showing examples of first downlink information and second downlink information.

For example, as shown in FIG. 5, the first downlink information is wide-area traffic information, and has a plurality of local traffic information. Accordingly, not all but part of the first downlink information is necessary for the mobile terminal 3. Relevant portion identification information, indicating traffic information of a specific area necessary for the mobile terminal 3 that has transmitted the uplink information, is transmitted as the second downlink information to the mobile terminal 3.

Also in this case, the information processing section 33 of the mobile terminal 3 obtains necessary information by performing information processing using the first downlink information and the second downlink information. Specifically, the mobile terminal 3 can obtain the traffic information (in area B) that is necessary for the mobile terminal 3 by referring to the first downlink information (wide-area traffic information) based on the second downlink information (relevant portion identification information).

Thus, the first downlink information and the second downlink information may be information for identifying a signal to be used in the mobile terminal 3, among the information included in the first downlink information.

Further, the first downlink information may be formed such that, with the first downlink information alone, the mobile terminal 3 can obtain only simple information. The first downlink information may be formed such that the content of information to be used by the mobile terminal 3 is upgraded when the mobile terminal 3 acquires the second downlink information in addition to the first downlink information.

For example, among signal information from a traffic signal controller, which is to be included in the first downlink information, only a green light display time may be excluded from the first downlink information and included in the second downlink information. Thus, the green light display time may become usable for the mobile terminal 3 only when the mobile terminal 3 combines the second downlink information with the first downlink information.

Figure 6:
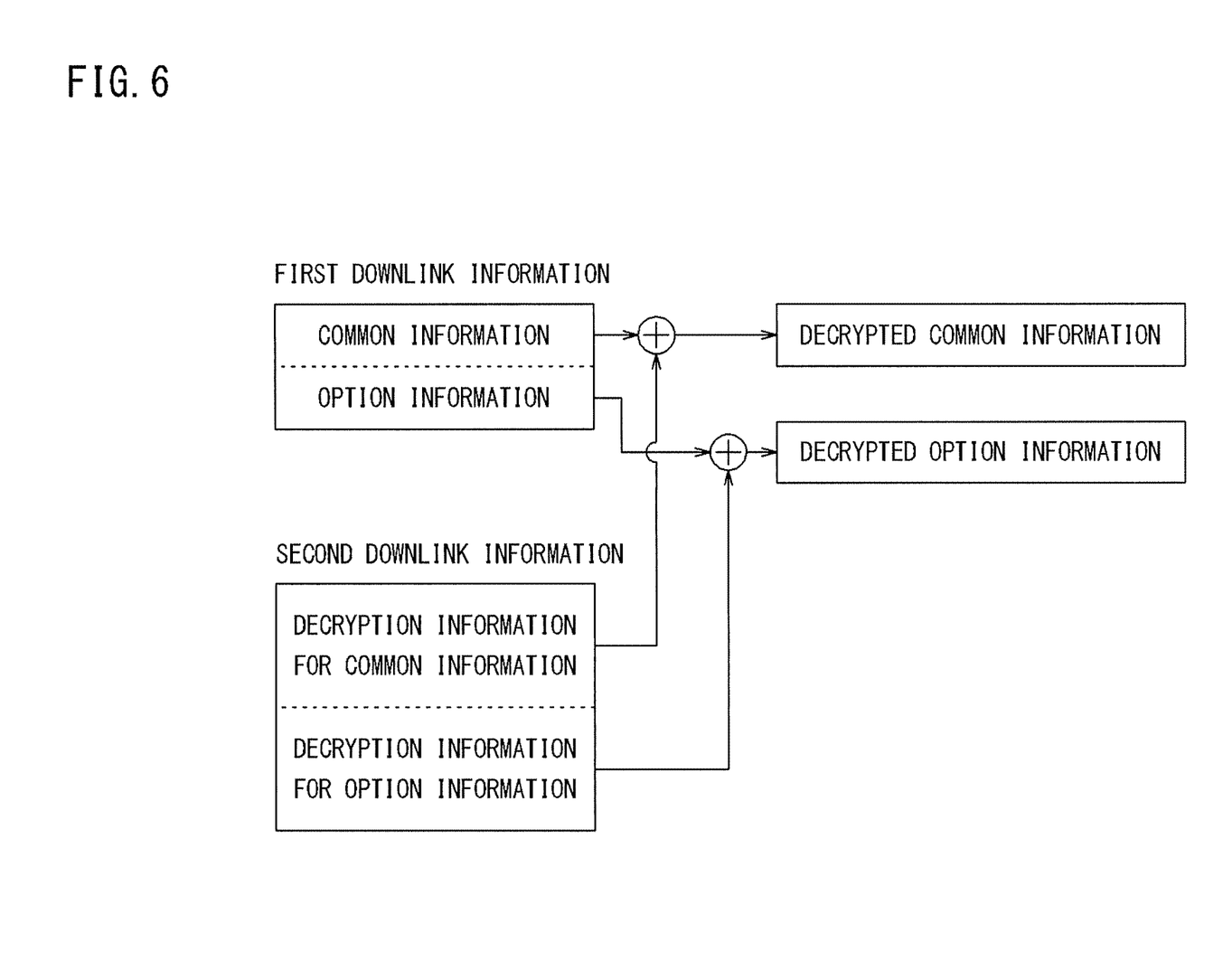
FIG. 6 is a diagram showing examples of first downlink information and second downlink information.

As shown in FIG. 6; the first downlink information transmitted by point-to-multipoint communication may include option information, in addition to information (common information) to be commonly distributed to all the on-vehicle mobile terminals 3. The common information and the option information are encrypted by using different keys.

When the mobile terminal 3 transmits the uplink information including an option information request, the ITS server 5 provides, to the base station 2, a decryption key for decrypting the common information and a second decryption key for decrypting the option information, as the second downlink information. Upon acquiring the decryption key for decrypting the common information and the second decryption key for decrypting the option information from the base station 2, the mobile terminal 3 can decrypt both the common information and the option information.

In this case, a mobile terminal 3 that has transmitted uplink information including no option information request acquires only the decryption key for decrypting the common information.

The option information shown in FIG. 6 may be included not in the first downlink information but in the second downlink information. When the option information is included in the second downlink information, the option information need not be encrypted. Thus, the content of the second downlink information may be changed according to the content of the uplink information.

Further, the second decryption key for decrypting the option information or the option information as the second downlink information may be transmitted to a mobile terminal 3 that has transmitted uplink information including many pieces of valuable information or to a mobile terminal 3 having a large number of times of uplink information transmission per given time period.

If the option information is included in the second downlink information, the channel capacity of the point-to-point communication needs to be increased, which might lead to depletion of radio resources. Therefore, if there are many vehicles that request the option information, the second downlink information may be transmitted without including the option information therein, or the second downlink information may be transmitted with the data size of the option information being reduced (with part of information included in the option information being deleted).

The option information may be included in the second downlink information when the number of mobile terminals 3 that request the option information is small, whereas the option information may be included in the first downlink information when the number of mobile terminals 3 that request the option information is large. In the case where the option information is included in the first downlink information, the decryption key for decrypting the option information is provided as the second downlink information to the mobile terminals 3.

Regarding discrimination between the common information and the option information, for example, general traffic information (information indicating the status of road congestion, such as link travel time and link congestion degree) may be regarded as the common information, and signal information may be regarded as the option information. In this case, if the mobile terminal 3 needs not only the simple traffic information but also the signal information, the mobile terminal 3 may transmit the uplink information including an option information request.

When the signal information is the option information, the option information is transmitted to only a vehicle (a vehicle equipped with a drive support function) that utilizes information relating to drive support as to whether the vehicle can pass through an intersection where a traffic signal unit is installed, whereby the amount of the downlink information can be reduced. Whether a vehicle is equipped with such a drive support function can be identified based on, for example, information indicating presence/absence of the drive support function, which information is included in the uplink information transmitted by the vehicle.

Further, the traffic information may be the common information, and advertising information relating to stores such as restaurants and retail shops located in an area near a vehicle (mobile terminal 3) may be the option information.

Further, the common information may be free of charge, and the option information may be charged. Charging on the option information may be performed when the decryption key for the option information is transmitted.

Figure 7:
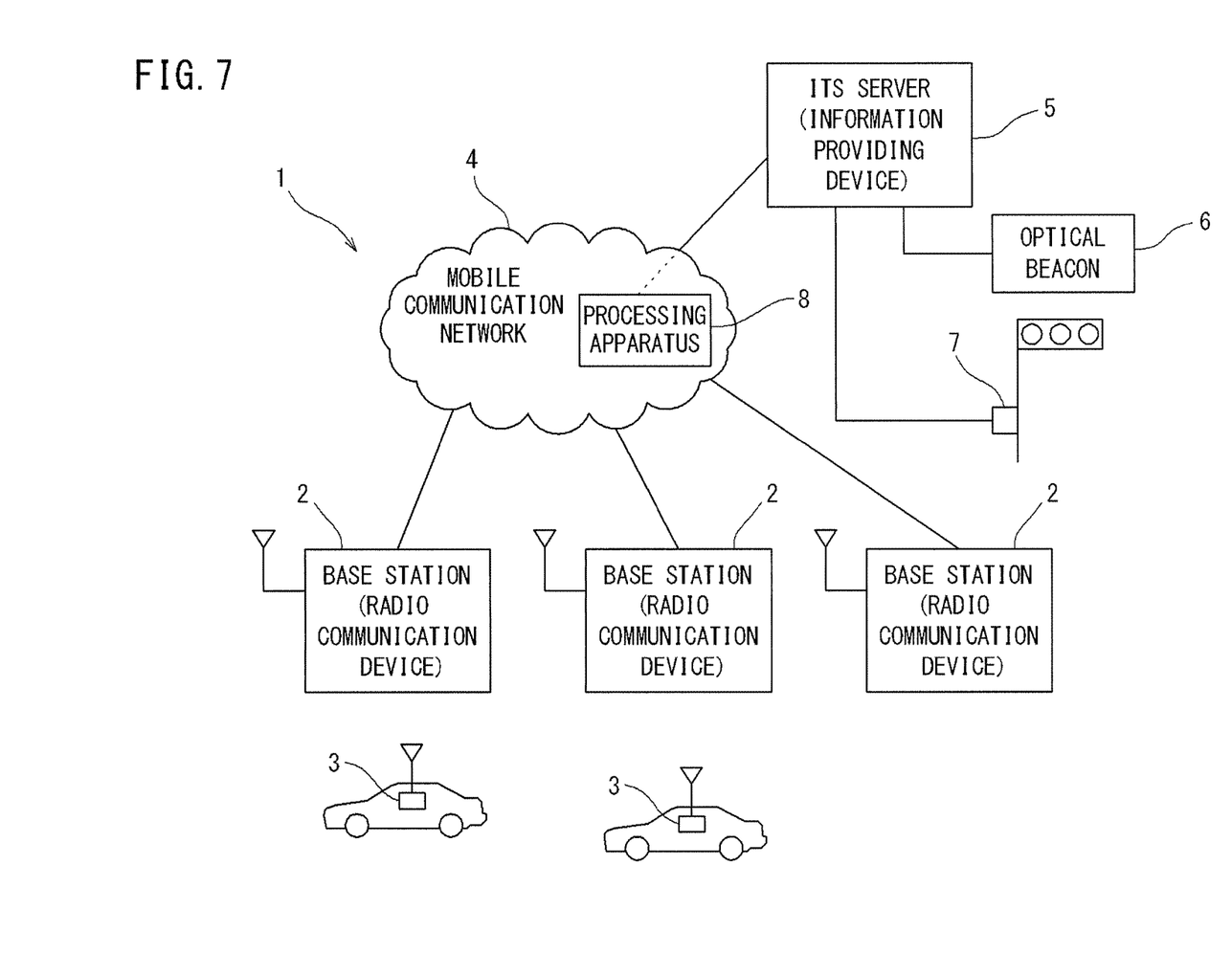
FIG. 7 is an overall configuration diagram of a radio communication system according to a modification.

FIG. 7 shows a modification of the radio communication system 1. In the radio communication system 1 shown in FIG. 7, the function of the ITS server 5 in the radio communication system 1, which is shown in FIGS. 1 and 2, is separated into an ITS server 5 and a processing apparatus 8. The processing apparatus 8 is provided in the mobile communication network 4.

Among the functions of the ITS server 5 shown in FIG. 2, the ITS server 5 shown in FIG. 7 includes the information generation section 54, and the processing apparatus 8 includes the other functions (the first information providing section 51, the second information providing section 52, and the acquisition section 53).

The information generation section 5 of the ITS server 5 shown in FIG. 7 generates information (first downlink information) such as traffic information based on the information acquired by the acquisition section 53 of the processing apparatus 8. At this time, the information (first downlink information) is not encrypted in the ITS server 5, and the generated information (first downlink information) is transmitted to the processing apparatus 8.

The first information providing section 51 of the processing apparatus 8 encrypts part or entirety of the first downlink information received from the ITS server 5, and causes the base stations 2 to transmit the first downlink information to the mobile terminals 3 by point-to-multipoint communication. Then, the second information providing section 52 of the processing apparatus 8 transmits the second downlink information (decryption key) to the mobile terminals in accordance with the uplink information.

Both the ITS server 5 and the processing apparatus 8 may have the functions of the first information providing section 51 and the second information providing section 52.

For example, as shown in FIG. 6, when the common information and the option information are provided as the first downlink information, the first information providing section 51 of the ITS server 5 encrypts the common information and provides the encrypted common information as a part of the first downlink information to the base station 2, while the second information providing section 52 of the ITS server 5 provides a decryption key for decrypting the common information as a part of the second downlink information to the base station 2.

On the other hand, the first information providing section 51 of the processing apparatus 8 encrypts the option information and provides the encrypted option information as another part of the first downlink information to the base station 2, while the first information providing section 52 of the processing apparatus 8 provides a second decryption key for decrypting the option information as another part of the second downlink information to the base station device 2.

The functions of the processing apparatus 8 described above may be included in another device in the base station 2 or the mobile communication network.

Note that the embodiments disclosed are to be considered in all respects as illustrative and not restrictive. The scope of the invention is indicated by the appended claims rather than by the foregoing meaning, and all changes which come within the meaning and range of equivalency of the claims are therefore intended to be embraced therein.

REFERENCE SIGNS LIST 1 radio communication system
2 base station (radio communication device)
3 mobile terminal
4 mobile communication network
5 ITS server (information providing device)
6 optical beacon
7 traffic signal controller
8 processing apparatus
41 gateway
51 first information providing section
52 second information providing section
53 acquisition section
54 information generation section
31 reception section
32 transmission section
33 information processing section

The invention claimed is:

1. A radio communication system that provides information to a mobile terminal via a base station that performs radio communication with the mobile terminal, wherein
the base station is capable of performing point-to-point radio communication with the mobile terminal, and capable of performing point-to-multipoint radio communication with the mobile terminal,
the mobile terminal is capable of receiving first downlink information that has been transmitted from the base station by point-to-multipoint radio communication receivable by a plurality of the mobile terminals, and subsequent to receipt of the first downlink information, capable of receiving second downlink information that has been transmitted from the base station by point-to-point communication, the first downlink information including encrypted vehicular traffic information, the second downlink information including information for decrypting the encrypted vehicular traffic information of the first downlink to obtain the vehicular traffic information from the first downlink information transmitted from the base station by point-to multipoint radio communication and being used by the mobile terminal, the mobile terminal performing information processing using both the first downlink information and the second downlink information, the decryption information is valid only for decryption of the first downlink information transmitted from a base station that has transmitted the decryption information, or is valid only for decryption of the first downlink information transmitted from a plurality of specific base stations,
the mobile terminal is capable of transmitting uplink information to the base station by point-to-point radio communication, the uplink information including position information of the mobile terminal, the position information being used for updating the vehicular traffic information,
the base station is capable of transmitting, by the point-to-point communication, the second downlink information to the mobile terminal that transmitted the uplink information including the position information of the mobile terminal, when the base station acquires the uplink information including the position information of the mobile terminal, and
the mobile terminal that transmitted the uplink information including the position information receives, by the point-to-point radio communication, the second downlink information to obtain the vehicular traffic information from the first downlink information received by the point-to-multipoint radio communication and obtains the vehicular traffic information to be used in the mobile terminal by performing the information processing using both the first downlink information and the second downlink information.

2. The radio communication system according to claim 1, wherein
the decryption information is valid only when the mobile terminal that has received the decryption information is present at a position in a predetermined area.

3. The radio communication system according to claim 1, wherein
the first downlink information includes common information to be decrypted by first decryption information, and option information to be decrypted by second decryption information different from the first decryption information, and
the second downlink information includes the first decryption information, and further includes the second decryption information when the uplink information includes an option information request.

4. The radio communication system according to claim 1, wherein the second downlink information includes information that is relevant to only a part of the first downlink information.

5. The radio communication system according to claim 1, wherein the first downlink information includes information to be updated based on the uplink information.

6. The radio communication system according to claim 1, wherein the decryption information is disposable decryption information.

7. The radio communication system according to claim 1, wherein the mobile terminal transmits uplink information by the point-to-point communication when the mobile terminal becomes ready to receive the first downlink information.

8. The radio communication system according to claim 1, wherein the second downlink information varies depending on the content of the uplink information.

9. The radio communication system according to claim 1, wherein the second downlink information includes option information that has been requested, in the uplink information, to be included in the second downlink information.

10. The radio communication system according to claim 1, wherein the base station and the mobile terminal communicate with each other directly.

11. An information providing device that provides information to a mobile terminal via a base station that performs radio communication with the mobile terminal, the base station being capable of performing point-to-point radio communication with the mobile terminal, and capable of performing point-to-multipoint radio communication with the mobile terminal, and the information providing device comprising:

a first information providing section that provides, to the base station, first downlink information to be transmitted from the base station by point-to-multipoint communication receivable by a plurality of the mobile terminals, the first downlink information including encrypted vehicular traffic information;

a second information providing section that provides, to the base station, second downlink information to be transmitted from the base station by point-to-point communication with the mobile terminal, the second downlink information including information for decrypting the encrypted vehicular traffic information of the first downlink to obtain the vehicular traffic information from the first downlink information transmitted from the base station by point-to multipoint radio communication and being used by the mobile terminal, the mobile terminal performing information processing using both the first downlink information and the second downlink information, the decryption information is valid only for decryption of the first downlink information transmitted from a base station that has transmitted the decryption information, or is valid only for decryption of the first downlink information transmitted from a plurality of specific base stations; and an acquisition section that acquires, via the base station, uplink information transmitted from the mobile terminal to the base station by the point-to-point communication, the uplink information including position information of the mobile terminal, the position information being used for updating the vehicular traffic information, wherein the second information providing section provides the second downlink information to the base station when acquiring the uplink information including the position information of the mobile terminal, the mobile terminal that transmitted the uplink information including the position information receives, subsequent to receipt of the first downlink information, by the point-to-point radio communication, the second downlink information to obtain the vehicular traffic information from the first downlink information received by the point-to-multipoint radio communication, and the mobile terminal obtains the vehicular traffic information to be used in the mobile terminal by performing the information processing using both the first downlink information and the second downlink information.

12. The information providing device according to claim 11, wherein the base station and the mobile terminal communicate with each other directly.

13. A mobile terminal that performs radio communication with a base station, the base station being capable of performing point-to-point radio communication with the mobile terminal, and capable of performing point-to-multipoint radio communication with the mobile terminal, and the mobile terminal comprising:

a reception section capable of receiving first downlink information transmitted from the base station by point-to-multipoint radio communication also receivable by other mobile terminals, and subsequent to receipt of the first downlink information, capable of receiving second downlink information transmitted from the base station by point-to-point radio communication, the first downlink information including encrypted vehicular traffic information, the second downlink information including information for decrypting the encrypted vehicular traffic information of the first downlink to obtain the vehicular traffic information from the first downlink information transmitted from the base station by point-to-multipoint radio communication and being used by the mobile terminal, the mobile terminal performing information processing using both the first downlink information and the second downlink information, the decryption information is valid only for decryption of the first downlink information transmitted from a base station that has transmitted the decryption information, or is valid only for decryption of the first downlink information transmitted from a plurality of specific base stations;

a transmission section capable of transmitting uplink information to the base station by the point-to-point communication, the uplink information including position information of the mobile terminal; the position information being used for updating the vehicular traffic information, and an information processing section that performs the information processing using both the received first downlink information and second downlink information received from the base station; and wherein the reception section of the mobile terminal that transmitted the uplink information including the position information receives, by the point-to-point radio communication, the second downlink information to obtain the vehicular traffic information from the first downlink information received by the point-to-multipoint radio communication, and the information processing section of the mobile terminal that transmitted the uplink information including the position information obtains the vehicular traffic information to be used in the mobile terminal by performing the information processing using both the first downlink information and the second downlink information.

14. The mobile terminal according to claim 13, wherein the base station and the mobile terminal communicate with each other directly.

15. A method for providing information from a base station to a mobile terminal, the base station being capable of performing point-to-point radio communication with the mobile terminal, and capable of performing point-to-multipoint radio communication with the mobile terminal, and the method comprising:

a step of causing the mobile terminal to receive first downlink information transmitted from the base station by point-to-multipoint radio communication receivable by a plurality of the mobile terminals, the first downlink information including encrypted vehicular traffic information, the second downlink information including information for decrypting the encrypted vehicular traffic information of the first downlink to obtain the vehicular traffic information from the first downlink information transmitted from the base station by point-to multipoint radio communication and being used by the mobile terminal, the mobile terminal performing information processing using both the first downlink information and the second downlink information, the decryption information is valid only for decryption of the first downlink information transmitted from a base station that has transmitted the decryption information, or is valid only for decryption of the first downlink information transmitted from a plurality of specific base stations;

a step of the mobile terminal transmitting uplink information to the base station by point-to-point radio communication, the uplink information including position information of the mobile terminal; the position information being used for updating the vehicular traffic information;

a step of the base station that acquired the uplink information including the position information of the mobile terminal transmitting second downlink information by the point-to-point communication to the mobile terminal that transmitted the uplink information including the position information of the mobile terminal, the second downlink information being necessary information to obtain the vehicular traffic information from the first downlink information transmitted from the base station by point-to multipoint radio communication and being used by the mobile terminal, the mobile terminal performing information processing using both the first downlink information and the second downlink information;

a step of the mobile terminal that transmitted the uplink information including the position information receiving, subsequent to receipt of the first downlink information, by the point-to-point radio communication, the second downlink information to obtain the vehicular traffic information from the first downlink information received by the point-to-multipoint radio communication; and a step of the mobile terminal that transmitted the uplink information including the position information obtaining the traffic information to be used in the mobile terminal by performing the information processing using both the first downlink information and the second downlink information.

16. The method according to claim 15, wherein the base station and the mobile terminal communicate with each other directly.

* * * * *